(12) United States Patent
Pears et al.

(10) Patent No.: US 9,399,211 B2
(45) Date of Patent: Jul. 26, 2016

(54) MICROENCAPSULATED CATALYST-LIGAND SYSTEM

(71) Applicant: Reaxa Limited, Blackley, Manchester (GB)

(72) Inventors: David A. Pears, Poynton (GB); Kevin E. Treacher, Northwich (GB); Mohammed Nisar, Altrincham (GB)

(73) Assignee: Reaxa Limited, Manchester (GB)

( * ) Notice: Subject to any disclaimer, the term of this patent is extended or adjusted under 35 U.S.C. 154(b) by 0 days.

(21) Appl. No.: 14/817,965

(22) Filed: Aug. 4, 2015

(65) Prior Publication Data

US 2016/0030935 A1     Feb. 4, 2016

Related U.S. Application Data

(63) Continuation of application No. 12/224,214, filed as application No. PCT/GB2007/000567 on Feb. 20, 2007, now abandoned.

(51) Int. Cl.
    *B01J 31/06*     (2006.01)
    *B01J 31/22*     (2006.01)
    *B01J 37/02*     (2006.01)
    *B01J 13/16*     (2006.01)

(52) U.S. Cl.
    CPC ........ *B01J 31/06* (2013.01); *B01J 13/16* (2013.01); *B01J 31/2208* (2013.01); *B01J 37/0219* (2013.01)

(58) Field of Classification Search
None
See application file for complete search history.

(56) References Cited

U.S. PATENT DOCUMENTS

| | | | |
|---|---|---|---|
| 5,124,464 A | 6/1992 | Rosenblum et al. |
| 6,174,919 B1 | 1/2001 | Hickey |
| 2004/0077905 A1 | 4/2004 | Kobayashi |
| 2007/0027028 A1 | 2/2007 | Pears et al. |

FOREIGN PATENT DOCUMENTS

| | | |
|---|---|---|
| EP | 0032455 A2 | 7/1981 |
| JP | 48013487 | 2/1973 |
| WO | WO-03/006151 A1 | 1/2003 |
| WO | WO-2005/016510 A1 | 2/2005 |

OTHER PUBLICATIONS

Terashima et al. JACS, 2003, 125, 5288-5289.*
Nair, V. A. et al., "Heterogeneous catalysts for aromatic coupling and substitution reactions", *Reactive & Functional Polymers*, 57:33-40 (Elsevier B. V., 2003).

* cited by examiner

*Primary Examiner* — Yun Qian
(74) *Attorney, Agent, or Firm* — Dana M. Gordon; Foley Hoag LLP

(57) ABSTRACT

A microencapsulated catalyst-ligand system is provided comprising a catalyst and a ligand microencapsulated within a permeable polymer microcapsule shell, wherein the ligand is a polymeric ligand. Processes for the preparation of said microencapsulated catalyst-ligand system are also provided.

15 Claims, No Drawings

MICROENCAPSULATED CATALYST-LIGAND SYSTEM

CROSS-REFERENCE TO RELATED APPLICATIONS

This application is a continuation of U.S. patent application Ser. No. 12/224,214, filed Oct. 3, 2008, which is the U.S. national phase of International Patent Application No. PCT/GB2007/000567, filed Feb. 20, 2007; which claims the benefit of Great Britain Patent Application No. 0603501.8, filed Feb. 22, 2006.

FIELD OF THE INVENTION

This invention relates to catalyst systems, in particular to microencapsulated catalyst systems and processes for their preparation.

BACKGROUND TO THE INVENTION

WO 03/006151 describes encapsulated catalyst systems and methods for their production. In particular, this publication describes palladium-based encapsulated catalysts that find use in coupling reactions. These palladium-based systems are most often derived by micro-encapsulation of palladium acetate.

WO 2005/016510 describes a process in which a metal catalyst is microencapsulated in the presence of a ligand. This publication describes that the use of a ligand may reduce catalyst leaching during the encapsulation process.

SUMMARY OF THE INVENTION

The present invention is based on a discovery that catalyst leaching from a microencapsulated catalyst-ligand system during use can be reduced using a polymeric ligand. Without wishing to be bound by theory, it is believed that polymeric ligands are bound tightly within the polymer matrix of the microcapsule, thereby retaining the catalyst within the microcapsule. This binding may arise through steric interactions (such as chain entanglement or greatly reduced diffusion rates of larger molecules) or through chemical binding, such as ionic, electrostatic or covalent bonds formed by polymerisation with the microcapsule shell or a constituent (e.g. a monomer or prepolymer) thereof.

According to a first aspect of the present invention there is provided a microencapsulated catalyst-ligand system comprising a catalyst and a ligand microencapsulated within a permeable polymer microcapsule shell, wherein the ligand is a polymeric ligand.

According to a second aspect of the invention there is provided a process for the preparation of a microencapsulated catalyst-ligand system, which comprises:
(i) forming a microcapsule shell by interfacial polymerisation in the presence of a catalyst and a ligand;
(ii) forming a microcapsule shell by interfacial polymerisation in the presence of a catalyst and treating the microcapsule shell with a ligand; or
(iii) forming a microcapsule shell by interfacial polymerisation in the presence of a ligand and treating the microcapsule shell with a catalyst solution;
wherein the ligand is a polymerisable ligand and the process further comprises polymerising the ligand prior to, during or after formation of the microcapsule shell.

DESCRIPTION OF VARIOUS EMBODIMENTS

Ligand

Microencapsulated catalyst-ligand systems of the invention comprise a polymeric ligand. Said systems may be obtained through a process involving polymerisation of a polymerisable ligand, i.e. a ligand which is capable of undergoing polymerisation.

Various types of polymerisation are encompassed by the present invention. For example, the ligand may undergo self-polymerisation to form a polymer which is bound within the microcapsule shell by steric interactions with the microcapsule matrix. Alternatively, the ligand may copolymerise with another species, for example the microcapsule shell or a constituent (e.g. a monomer or prepolymer) thereof. The ligand may therefore be in the form of one or more pendant groups bound to the microcapsule matrix. Alternatively or additionally, the ligand may copolymerise with another ligand type, to form a copolymeric ligand which may or may not be bound to the microcapsule matrix. The ligand may be polymerised by any suitable polymerisation known in the art, for example free radical, addition or condensation polymerisation.

The polymerisable ligand may be an organic ligand. Organic ligands typically include organic moieties which comprise at least one functional group or heteroatom which can coordinate to the metal atoms of the catalyst. Organic ligands include mono-functional, bi-functional and multi-functional ligands. Mono-functional ligands comprise only one functional group or heteroatom which can coordinate to a metal. Bi-functional ligands or multi-functional ligands comprise more than one functional group or heteroatom which can coordinate to a metal.

The organic ligand may be an organic moiety comprising one or more heteroatoms selected from N, O, P and S.

In particular, the organic ligand may be an organic moiety comprising one or more P atoms.

Of particular mention are organic ligands of formula (1):

  (1)

wherein:
$R^1$, $R^2$ and $R^3$ are each independently an optionally substituted hydrocarbyl group, an optionally substituted hydrocarbyloxy group, an optionally substituted hydrocarbyl group where one or more carbon atoms in the group are replaced by a sulphur, oxygen or nitrogen atom, or an optionally substituted heterocyclyl group or one or more of $R^1$ & $R^2$, & $R^3$, $R^2$ & $R^3$ optionally being linked in such a way as to form an optionally substituted ring(s); and
at least one of $R^1$, $R^2$ and $R^3$ comprises a polymerisable group.

Hydrocarbyl groups which may be represented by $R^{1-3}$ independently include alkyl, alkenyl and aryl groups, and any combination thereof, such as aralkyl and alkaryl, for example benzyl groups.

Alkyl groups which may be represented by $R^{1-3}$ include linear and branched alkyl groups comprising up to 20 carbon atoms, particularly from 1 to 7 carbon atoms and more particularly from 1 to 5 carbon atoms. When the alkyl groups are branched, the groups often comprise up to 10 branch chain carbon atoms, in particular up to 4 branch chain atoms. In certain embodiments, the alkyl group may be cyclic, commonly comprising from 3 to 10 carbon atoms in the largest ring and optionally featuring one or more bridging rings. Examples of alkyl groups which may be represented by $R^{1-3}$ include methyl, ethyl, propyl, 2-propyl, butyl, 2-butyl, t-butyl and cyclohexyl groups.

Alkenyl groups which may be represented by $R^{1-3}$ include $C_{2-20}$, in particular $C_{2-6}$ alkenyl groups. One or more carbon-carbon double bonds may be present. The alkenyl group may carry one or more substituents, particularly phenyl substituents. Examples of alkenyl groups include vinyl, allyl, styryl and indenyl groups.

Aryl groups which may be represented by $R^{1-3}$ may contain 1 ring or 2 or more fused rings which may include cycloalkyl, aryl or heterocyclic rings. Examples of aryl groups which may be represented by $R^{1-3}$ include phenyl, tolyl, fluorophenyl, pentafluorophenyl, chlorophenyl, bromophenyl, trifluoromethylphenyl, anisyl, naphthyl and ferrocenyl groups.

Heterocyclic groups which may be represented by $R^{1-3}$ independently include aromatic, saturated and partially unsaturated ring systems and may constitute 1 ring or 2 or more fused rings which may include cycloalkyl, aryl or heterocyclic rings. The heterocyclic group will contain at least one heterocyclic ring, the largest of which will commonly comprise from 3 to 7 ring atoms in which at least one atom is carbon and at least one atom is any of N, O, S or P. Examples of heterocyclic groups which may be represented by $R^{1-3}$ include pyridyl, pyrimidyl, pyrrolyl, thiophenyl, furanyl, indolyl, quinolyl, isoquinolyl, imidazoyl and triazoyl groups.

Any of $R^{1-3}$ may further comprise one or more other substituents. In this case, the one or more other substituents should normally be selected so as not to adversely affect the activity of the catalyst or the ability of the group to undergo polymerisation. Examples of suitable optional substituents include halogen, cyano, nitro, hydroxy, amino, thiol, acyl, hydrocarbyl, perhalogentated hydrocarbyl, heterocyclyl, hydrocarbyloxy, mono or di-hydrocarbylamino, hydrocarbylthio, esters, carboxylate, carbonates, amides, sulphonate, sulphonyl and sulphonamido groups, wherein the hydrocarbyl groups are as defined for $R^1$ above. One or more substituents may be present, and includes when any of $R^1$, $R^2$ or $R^3$ is a perhalogenated hydrocarbyl group. Examples of perhalogenated hydrocarbyl groups which may be represented by $R^{1-3}$ include —$CF_3$ and —$C_2F_5$ and pentafluorophenyl.

When any of $R^1$ and $R^2$, $R^1$ and $R^3$, and $R^2$ and $R^3$ are linked in such a way that, when taken together with the phosphorus atom to which they are attached, a ring is formed, In this case, the ring is often a 5-, 6- or 7-membered rings.

The ligand may be capable of undergoing free radical polymerisation. The term "free radical" as used herein includes reference to an atomic or molecular species which contains an unpaired electron. Thus, the ligand may comprise one or more atoms or groups which are susceptible to free radical polymerisation. Of particular mention are organic ligands comprising one or more of said atoms or groups. With regard to formula (1), at least one of $R^1$, $R^2$ and $R^3$ may comprise a group which is capable of undergoing free radical polymerisation.

By way of example, the ligand may comprise one or more groups selected from optionally substituted alkenyl groups, for example vinyl, vinylidene, allyl, butadienyl, isoprenyl, acrylate, methacrylate, vinyl carboxylates and vinyl ethers; aliphatic or aromatic thiols (thiophenols); and tin hydrides. Thus, where the polymerisable ligand is a ligand of the formula (1), at least one of $R^1$, $R^2$ and $R^3$ may comprise one of these groups. Particularly preferred are ligands, for example those of Formula (1), which comprise one or more styryl, vinyl or allyl groups.

Of particular mention are phosphorus-based ligands of formula (1) including (4-styryl)diphenylphosphine, di-(4-styryl)phenylphosphine, tri-4-styrylphosphine, and corresponding 2-styryl and 3-styryl isomers thereof, (4-styryl)di-2-tolylphosphine, di-(4-styryl)-2-tolylphosphine, (4-styryl) di-2-tolylphosphine, di-(4-styryl)-2-tolylphosphine and corresponding 2-styryl and 3-styryl isomers thereof, allyldiphenylphosphine, diallylphenylphosphine, triallylphosphine, allydibutylphosphine, vinyldiphenylphosphine, divinvlohenvlphosphine, trivinylphosphine, or one or the following ligands:

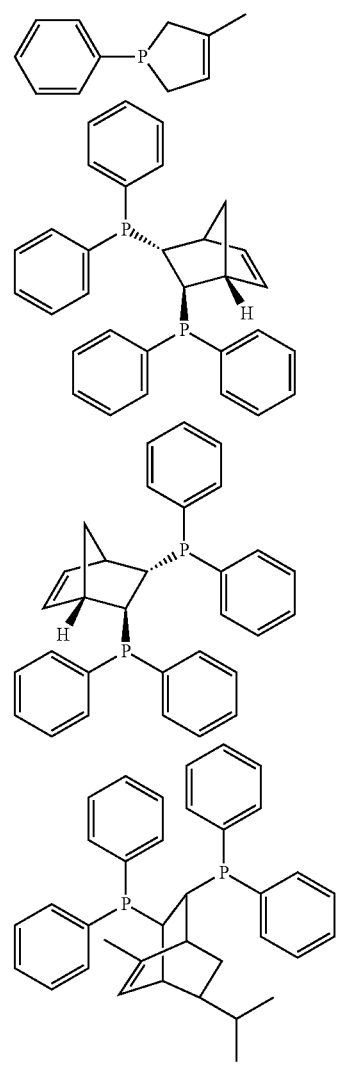

The polymerisable ligand may comprise a cyclopentadienyl group, which may be substituted or unsubstituted. For example, one or more of the ring carbon atoms of the cyclopentadienyl group may be substituted with a group capable of binding to a polymeric structure. Of particular mention are cyclopentadienyl ligands of the following formulae:

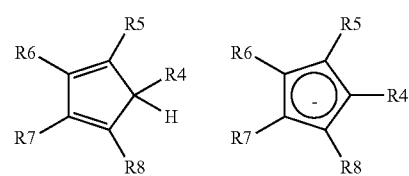

wherein:
$R^4$, $R^5$, $R^6$, $R^7$ and $R^5$ are each independently H or an optionally substituted hydrocarbyl group, an optionally substituted hydrocarbyloxy group, an optionally substituted hydrocarbyl group where one or more carbon atoms in the group are replaced by a sulphur, oxygen or nitrogen atom, or an optionally substituted heterocyclyl group or two or more of $R^4$, $R^5$, $R^6$, $R^7$ and $R^8$ optionally being linked in such a way as to form an optionally substituted ring(s); and at least one of $R^4$, $R^5$, $R^6$, $R^7$ and $R^8$ comprises a polymerisable group.

Hydrocarbyl groups which may be represented by $R^{4-8}$ independently include alkyl, alkenyl and aryl groups, and any combination thereof, such as aralkyl and alkaryl, for example benzyl groups.

Alkyl groups which may be represented by $R^{4-8}$ include linear and branched alkyl groups comprising up to 20 carbon atoms, particularly from 1 to 7 carbon atoms and more particularly from 1 to 5 carbon atoms. When the alkyl groups are branched, the groups often comprise up to 10 branch chain carbon atoms, in particular up to 4 branch chain atoms. In certain embodiments, the alkyl group may be cyclic, commonly comprising from 3 to 10 carbon atoms in the largest ring and optionally featuring one or more bridging rings. Examples of alkyl groups which may be represented by $R^{4-8}$ include methyl, ethyl, propyl, 2-propyl, butyl, 2-butyl, t-butyl and cyclohexyl groups.

Alkenyl groups which may be represented by $R^{4-8}$ include $C_{2-20}$, in particular $C_{2-6}$ alkenyl groups. One or more carbon-carbon double bonds may be present. The alkenyl group may carry one or more substituents, particularly phenyl substituents. Examples of alkenyl groups include vinyl, allyl, styryl and indenyl groups.

Aryl groups which may be represented by $R^{4-8}$ may contain 1 ring or 2 or more fused rings which may include cycloalkyl, aryl or heterocyclic rings. Examples of aryl groups which may be represented by $R^{4-8}$ include phenyl, tolyl, fluorophenyl, pentafluorophenyl, chlorophenyl, bromophenyl, trifluoromethylphenyl, anisyl, naphthyl and ferrocenyl groups.

Heterocyclic groups which may be represented by $R^{4-8}$ independently include aromatic, saturated and partially unsaturated ring systems and may constitute 1 ring or 2 or more fused rings which may include cycloalkyl, aryl or heterocyclic rings. The heterocyclic group will contain at least one heterocyclic ring, the largest of which will commonly comprise from 3 to 7 ring atoms in which at least one atom is carbon and at least one atom is any of N, O, S or P. Examples of heterocyclic groups which may be represented by $R^{4-8}$ include pyridyl, pyrimidyl, pyrrolyl, thiophenyl, furanyl, indolyl, quinolyl, isoquinolyl, imidazoyl and triazoyl groups.

Any of $R^{4-8}$ may further comprise one or more other substituents. In this case, the one or more other substituents should normally be selected so as not to adversely affect the activity of the catalyst or the ability of the group to undergo polymerisation. Examples of suitable optional substituents include halogen, cyano, nitro, hydroxy, amino, thiol, acyl, hydrocarbyl, perhalogentated hydrocarbyl, heterocyclyl, hydrocarbyloxy, mono or di-hydrocarbylamino, hydrocarbylthio, esters, carboxylate, carbonates, amides, sulphonate, sulphonyl and sulphonamido groups, wherein the hydrocarbyl groups are as defined for $R^{4-8}$ above.

Polymerisable cyclopentadienyl ligands may be incorporated into the microencapsulated polymer in uncomplexed form (e.g. with 2 substituents at the saturated carbon atom, one being a proton), or in the form of a metal complex of a cyclopentadienyl anion. Such complexes may be prepared using methods known to those skilled in the art, such as deprotonation or reaction with a metal salt.

Of mention as polymerisable cyclopentadienyl ligands are those where one or more of $R^4$, $R^5$, $R^6$, $R^7$ and $R^8$ comprises a hydroxyalkyl, aminoalkyl or alkenyl group.

Of particular mention as polymerisable cyclopentadienyl ligands are 1-(3-hydroxypropyl)-2,3,4,5-tetramethylcyclopentadiene, 1-(4-hydroxybutyl)-2,3,4,5-tetramethylcyclopentadiene, 1-(5-hydroxypentyl)-2,3,4,5-tetramethylcyclopentadiene, 1-(3-aminopropyl)-2,3,4,5-tetramethylcyclopentadiene, 1-(4-aminobutyl)-2,3,4,5-tetramethylcyclopentadiene, 1-(5-aminopentyl)-2,3,4,5-tetramethylcyclopentadiene and 1-(8-heptadecenyl)-2,3,4,5-tetramethylcyclopentadiene.

Polymerisation of the ligand may be performed using a free radical polymerisation process in which a ligand which is capable of undergoing free radical polymerisation is contacted with a free radical initiator. "Free radical initiation" refers to any method of generating free radicals.

Free radical polymerisation may be performed by any number of methods known to those skilled in the art. Examples of radical initiation methods include thermal activation, where a functional group can spontaneously produce a free radical or a pair of free radicals solely under the influence of heat; photolytic activation, where a functional group can spontaneously produce a free radical or a pair of free radicals solely under the influence of electromagnetic radiation; and activation using a chemical compound or a combination of chemical compounds which provide a free radical source upon applying certain conditions, for example heat or electromagnetic radiation. Usually a chemical compound or a combination of chemical compounds which provide a free radical source upon applying certain conditions, for example heat (known as thermal initiators) or electromagnetic radiation (known as photoinitiators), is employed as the free radical source.

Thermal activation can produce radicals from compounds with relatively weak bonds such as vinyl-type polymerisable groups. It is known for example that heating of pure styrene (i.e. containing no radical inhibitors) produces free radicals by thermal homolytic cleavage of the π-π bond, which then serve to initiate the polymerisation of the styrene, eventually resulting in a gel.

Useful thermal initiators include azo, peroxide, persulfate, and redox initiators.

Suitable azo initiators include 2,2'-azobis(2,4-dimethylvaleronitrile) (VAZO™ 52); 2,2'-azobis(isobutyronitrile) (VAZO™ 64); 2,2'-azobis-2-methylbutyronitrile (VAZO™ 67); and (1,1'-azobis(1-cyclohexanecarbonitrile) (VAZO™ 88), all of which are available from DuPont Chemicals, and 2,2'-azobis(methyl isobutyrate) (V-601) and 2,2'-azobis(2-amidinopropane)dihydrochloride (V-50™) available from Wako Chemicals. Also suitable is 2,2'-azobis(4-methoxy-2,4-dimethylvaleronitrile), formerly available from DuPont Chemicals as VAZO™ 33.

Suitable peroxide initiators include diacyl peroxides, peroxydicarbonates, monoperoxycarbonates, peroxyketals, peroxyesters, dialkyl peroxides, hydroperoxides. Examples include benzoyl peroxide, acetyl peroxide, lauroyl peroxide, decanoyl peroxide, diacetyl peroxydicarbonate, di(4-t-butylcyclohexyl) peroxydicarbonate (PERKADOX™ 16S, available from AKZO Chemicals), di(2-ethylhexyl) peroxydicarbonate, t-butyl peroxybenzoate, t-butyl peroxypivalate (LUPERSOL™ 1, available from Atochem), t-butyl peroxy-2-ethylhexanoate (TRIGONOX™ 21-050, available from Akzo Chemicals, Inc.), and dicumyl peroxide.

Suitable persulfate initiators include potassium persulfate, sodium persulfate, and ammonium persulfate.

Suitable redox (reduction-oxidation) initiators include combinations of the above persulfate initiators with reducing agents such as sodium metabisulfite and sodium bisulfite; systems based on organic peroxides and tertiary amines (for example, benzoyl peroxide plus dimethylaniline); and systems based on organic hydroperoxides or hydrogen peroxide and transition metals, for example, cumene hydroperoxide plus cobalt naphthenate.

Useful photoinitiators include those capable of being activated by UV radiation, e.g., at wavelengths from about 250 nm to about 450 nm, e.g. at about 351 nm. Useful photoinitiators include e.g. benzoin ethers such as benzoin methyl ether and benzoin isopropyl ether, substituted benzoin ethers, aryiphospine oxide, substituted acetophenones such as 2,2-dimethoxy-2-phenylacetophenone, and substituted alpha-ketols (alpha-hydroxyketones). Examples of commercially available photoinitiators include Irgacure™ 819 and Darocur™ 1173 (both available from Ciba-Geigy Corp.), Lucern TPO™ (available from BASF) and Irgacure™ 651, (2,2-dimethoxy-1,2-diphenyl-1-ethanone, available from Ciba-Geigy corporation).

Of particular mention as free radical initiator systems are azo compounds and mixtures thereof.

A process of the present invention may be carried out using a free radical initiator, which may be included in the composition of the encapsulation process. In this case, the free radical initiator is preferably added to the organic phase of the encapsulation process. The free radical initiator may be used in a weight ratio to the ligand comprising a functional group susceptible to attack by free radical initiation of between 10/1 and 1/10000, preferably between 1/2 and 1/5000, more preferably between 1/10 and 1/2000 and highly preferably between 1/20 and 1/1000.

The ligand may be capable of copolymerising with the microcapsule shell or a constituent (e.g. a monomer or prepolymer) thereof. Suitable polymerisation methods will be apparent to those skilled in the art. For example, in the case of a prepolymer comprising a polyisocyanate (e.g. a diisocyanate), a ligand which is capable of reacting with the polyisocyanate can be contacted with the polyisocyanate, resulting in a composition in which the ligand is covalently bound to the prepolymer. Subsequent polymerisation of the microcapsule material results in a microcapsule comprising a ligand which is covalently bound to the microcapsule shell. With regard to formula (1), at least one of $R^1$, $R^2$ and $R^3$ may be capable of undergoing polymerisation with the microcapsule material.

By way of example, the ligand may comprise a group which is capable of reacting with an isocyanate compound. Such groups include nucleophilic groups, for example hydroxy, amino and mercapto groups. Thus, where the polymerisable ligand is a ligand of the formula (1), at least one of $R^1$, $R^2$ and $R^3$ may comprise one of these groups. An exemplary ligand is 3-(diphenylphosphino)propyl-1-amine, i.e.:

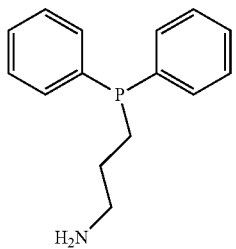 [SMILES: NCCCP(c1ccccc1)c1ccccc1]

Other compounds which are capable of reacting with isocyanate compounds include active methylene compounds such as β-diketones, β-ketoesters, β-ketoamides, and β-dicarboxylic acids and derivatives thereof. Particular compounds include malonic acid and esters or amides thereof, malononitrile, cyanoacetic acid and esters or amides thereof, and acetoacetate compounds.

Exemplary processes involving copolymerisation of a ligand and a polyisocyanate are illustrated below.

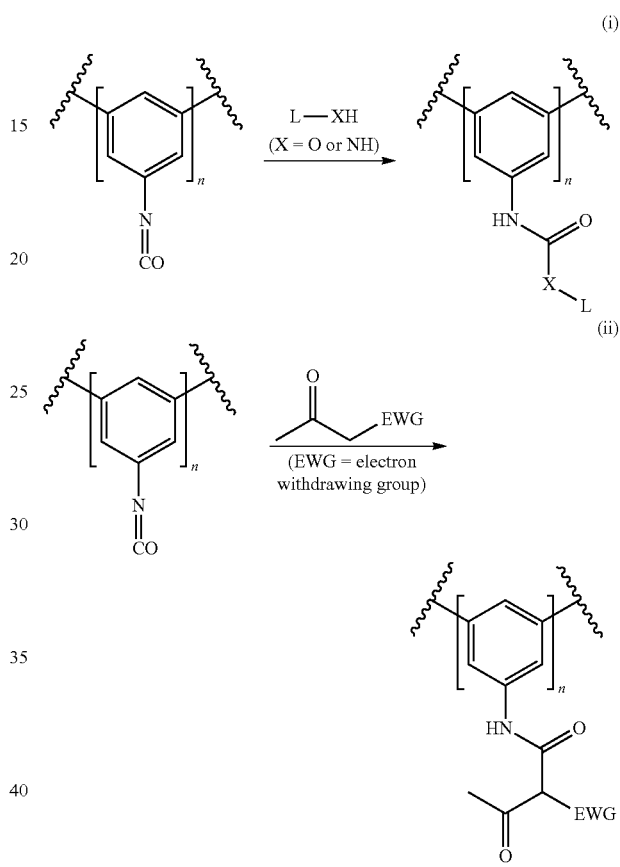

In certain cases, it may be desirable to use a polymerisable ligand which is complexed with a metal, in particular the metal catalyst. For example, active methylene compounds such as β-diketones, β-ketoesters, β-ketoamides, and β-dicarboxylic acids and derivatives thereof may be complexed with a transition metals (for example, Ni, Pd, Pt, Rh, Ru, Os or Ir), and the ligand subsequently polymerised with the microcapsule material. Of particular mention are transition metal (especially nickel) complexes formed with β-diketone ligands such as tetramethylheptanedionate, acetoacetate and acetoacetonate ligands. The use of such complexes may provide a way of successfully encapsulating nickel and other transition metal catalysts, which may otherwise prove difficult to encapsulate.

The ligand may comprise a plurality of moieties which are capable of undergoing polymerisation. Thus, the ligand may be capable of undergoing free radical polymerisation and may also bind with the microcapsule shell or a constituent (e.g. a monomer or prepolymer) thereof. For example, a ligand may comprise a group which is capable of undergoing free radical polymerisation (such as a vinyl group) and a group comprising an active methylene moiety (e.g. a group selected from β-diketones, β-ketoesters, β-ketoamides, β-dicarboxylic acid, aryl and heteroaryl groups). Examples of such ligands include acetoacetoxyethyl methacrylate, acetoacetoxyethyl acrylate, 2-vinylpyridine, 4-vinylpyridine and 1-allylimidazole.

The ligand may comprise a plurality of groups which are capable of polymerising with the microcapsule shell or a constituent thereof, examples of such ligands including acetoacetoxyethyl ligands substituted with one or more of hydroxy, amino and mercapto; such ligands may polymerise with the microcapsule material through either the keto or the hydroxy, amino or mercapto functionality. A particular ligand is 2-acetoacetoxyethanol, i.e. CH$_3$C(O)CH$_2$C(O)OCH$_2$CH$_2$OH.

Catalyst

The catalyst may be an inorganic catalyst, in particular a transition metal catalyst. The term "transition metal catalyst" as used herein include reference to (a) the transition metal itself, normally in finely divided or colloidal form; (b) a complex of a transition metal; or (c) a compound containing a transition metal. If desired a pre-cursor for the catalyst may be microencapsulated within the polymer microcapsule shell and subsequently converted to the catalyst, for example by heating. The term "catalyst" as used herein thus also includes a catalyst pre-cursor.

Transition metals on which a catalyst for use in the invention is based may include platinum, palladium, osmium, ruthenium, rhodium, iridium; rhenium, scandium, cerium, samarium, yttrium, ytterbium, lutetium, cobalt, titanium, chromium, copper, iron, nickel, manganese, tin, mercury, silver, gold, zinc, vanadium, tungsten and molybdenum. Particular catalysts for use in the present invention may be based include osmium, ruthenium, rhodium, platinum, titanium, nickel, vanadium and chromium, and especially palladium. Air sensitive catalysts may be handled using conventional techniques to exclude air.

Palladium in a variety of forms may be microencapsulated according to the present invention and is useful as a catalyst for a wide range of reactions.

Preferably palladium is used directly in the form of an organic solvent soluble form and is more preferably palladium acetate. Thus for example palladium acetate may be suspended or more preferably dissolved in a suitable solvent such as a hydrocarbon solvent or a chlorinated hydrocarbon solvent and the resultant solution may be microencapsulated according to the present invention. Chloroform is a preferred solvent for use in the microencapsulation of palladium acetate.

According to literature sources palladium acetate decomposes to the metal under the action of heat. Catalysts of the present invention derived from palladium acetate have proved to be effective, although it is not presently known whether palladium is present in the form of the metal or remains as palladium acetate.

It is understood that one or more ligands and/or one or more catalysts may be employed in the process of the present invention. Where multiple ligands and/or multiple catalysts are employed, each independently may be selected for the ability to enhance or catalyse the same or similar reaction types, or for the ability to enhance or catalyse different reaction types.

Microcapsule Preparation

A microencapsulated catalyst-ligand system of the invention is usually prepared by an interfacial polymerisation process. Interfacial polymerisation processes are described in, for example, WO 03/006151.

There are various types of interfacial polymerisation techniques but all involve reaction at the interface of a dispersed phase and a continuous phase in an emulsion system. Typically the dispersed phase is an oil phase and the continuous phase is an aqueous phase but interfacial polymerisation reactions at the interface of a continuous oil phase and a dispersed aqueous phase are also possible. Thus for example an oil or organic phase is dispersed into a continuous aqueous phase comprising water and a surface-active agent. The organic phase is dispersed as discrete droplets throughout the aqueous phase by means of emulsification, with an interface between the discrete organic phase droplets and the surrounding continuous aqueous phase solution being formed. Polymerisation at this interface forms the microcapsule shell surrounding the dispersed phase droplets.

In one type of interfacial condensation polymerisation microencapsulation process, monomers contained in the oil and aqueous phase respectively are brought together at the oil/water interface where they react by condensation to form the microcapsule wall. In another type of polymerisation reaction, the in situ interfacial condensation polymerisation reaction, all of the wall-forming monomers are contained in the oil phase. In situ condensation of the wall-forming materials and curing of the polymers at the organic-aqueous phase interface may be initiated by heating the emulsion to a temperature of between about 20° C. to about 100° C. and optionally adjusting the pH. The heating occurs for a sufficient period of time to allow substantial completion of in situ condensation of the prepolymers to convert the organic droplets to capsules consisting of solid permeable polymer shells entrapping the organic core materials.

One type of microcapsule prepared by in situ condensation and known in the art is exemplified in U.S. Pat. Nos. 4,956,129 and 5,332,584. These microcapsules, commonly termed "aminoplast" microcapsules, are prepared by the self-condensation and/or cross-linking of etherified urea-formaldehyde resins or prepolymers in which from about 50 to about 98% of the methylol groups have been etherified with a C$_4$-C$_{10}$ alcohol (preferably n-butanol). The prepolymer is added to or included in the organic phase of an oil/water emulsion. Self-condensation of the prepolymer takes place optionally under the action of heat at low pH. To form the microcapsules, the temperature of the two-phase emulsion is raised to a value of from about 20° C. to about 90° C., preferably from about 40° C. to about 90° C., most preferably from about 40° C. to about 60° C. Depending on the system, the pH value may be adjusted to an appropriate level. For the purpose of this invention a pH of about 1.5 to 3 is appropriate:

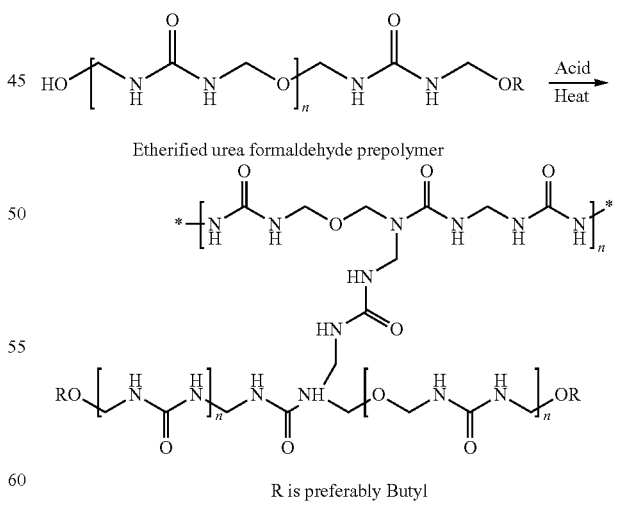

R is preferably Butyl

As described in U.S. Pat. No. 4,285,720 the prepolymers most suitable for use in this invention are partially etherified urea-formaldehyde prepolymers with a high degree of solubility in organic phase and a low solubility in water. Etherified urea-formaldehyde prepolymers are commercially available in alcohol or in a mixture of alcohol and xylene. Examples of preferred commercially available prepolymers include the Beetle etherified urea resins manufactured by BIP (e.g. BE607, BE610, BE660, BE676) or the Dynomin N-butylated urea resins from Dyno Cyanamid (e.g. Dynomin UB-24-BX, UB-90-BX etc.).

Acid polymerisation catalysts capable of enhancing the microcapsule formation can be placed in either the aqueous or the organic phase. Acid polymerisation catalysts are generally used when the core material is too hydrophobic, since they serve to attract protons towards the organic phase. Any water soluble acid polymerisation catalyst which has a high affinity for the organic phase can be used. Carboxylic and sulphonic acids are particularly useful.

One further type of microcapsule prepared by in situ condensation and found in the art, as exemplified in U.S. Pat. No. 4,285,720 is a polyurea microcapsule which involves the use of at least one polyisocyanate such as polymethylene polyphenyleneisocyanate (PMPPI) and/or tolylene diisocyanate (TDI) as the wall-forming material. In the creation of polyurea microcapsules, the wall-forming reaction is generally initiated by heating the emulsion to an elevated temperature at which point a proportion of the isocyanate groups are hydrolyzed at the interface to form amines, which in turn react with unhydrolyzed isocyanate groups to form the polyurea microcapsule wall. During the hydrolysis of the isocyanate monomer, carbon dioxide is liberated. The addition of no other reactant is required once the dispersion establishing droplets of the organic phase within a continuous liquid phase, i.e., aqueous phase, has been accomplished. Thereafter, and preferably with moderate agitation of the dispersion, the formation of the polyurea microcapsule can be brought about by heating the continuous liquid phase or by introducing a polymerisation catalyst such as an alkyl tin or a tertiary amine capable of increasing the rate of isocyanate hydrolysis.

The amount of the organic phase may vary from about 1% to about 75% by volume of the aqueous phase present in the reaction vessel. A preferred amount of organic phase is about 10 percent to about 50 percent by volume. The organic polyisocyanates used in this process includes both aromatic and aliphatic mono and poly functional isocyanates. Examples of suitable aromatic diisocyantes and other polyisocyantes include the following: 1-chloro-2,4-phenylene diisocyante, m-phenylene diisocyante (and its hydrogenated derivative), p-phenylene diisocyante (and its hydrogenated derivative), 4,4'-methylenebis (phenyl isocyante), 2,4-tolylene diisocyanate, tolylene diisocyanate (60% 2,4-isomer, 40% 2,6-isomer), 2,6-tolylene diisocyante, 3,3'-dimethyl-4,4'-biphenylene diisocyante, 4,4'-methylenebis (2-methylphenyl isocyante), 3,3'-dimethoxy-4,4'-biphenylene diisocyanate, 2,2',5,5'-tetramethyl-4,4'-biphenylene diisocyanate, 80% 2,4- and 20% 2,6-isomer of tolylene diisocyanate, polymethylene polyphenylisocyante (PMPPI), 1,6-hexamethylene diisocyanate, isophorone diisocyanate, tetramethylxylene diisocyanate and 1,5-naphthylene diisocyanate, hydrophilic aliphatic polyisocyanates based on hexamethylene diisocyanate (e.g. Bayhydur 3100, Bayhydur VP LS2319 and Bayhydur VP LS2336) and hydrophilic aliphatic polyisocyanates based on isophorone diisocyanate (e.g. Bayhydur VP LS2150/1)

It may be desirable to use combinations of the above mentioned polyisocyanates. Particular polyisocyantes are polymethylene polyphenylisocyante (PMPPI) and mixtures of polymethylene polyphenylisocyante (PMPPI) with tolylene diisocyanate or other difunctional aromatic or aliphatic isocyantes.

One further class of polymer precursors consists of a primarily oil-soluble component and a primarily water-soluble component which react together to undergo interfacial polymerisation at a water/oil interface. Typical of such precursors are an oil-soluble isocyanate such as those listed above and a water-soluble poly amine such as ethylenediamine and/or diethylenetriamine to ensure that chain extension and/or cross-linking takes place. Cross-linking variation may be achieved by increasing the functionality of the amine. Thus for example, cross-linking is increased if ethylenediamine is replaced by a polyfunctional amine such as DETA (diethylene triamine), TEPA (tetraethylene pentamine) and other well established cross linking amines. Isocyanate functionality can be altered (and thus cross-linking also altered) by moving from monomeric isocyanates such as toluene diisocyanate to PMPPI. Mixtures of isocyanates, for example mixtures of tolylene diisocyanate and PMPPI, may also be used. Moreover, the chemistry may be varied from aromatic isocyanates to aliphatic isocyanates such as hexamethylenediisocyanate and isophorone diisocyanate. Further modifications can be achieved by partially reacting the (poly) isocyanate with a polyol to produce an amount of a polyurethane within the isocyanate chemistry to induce different properties to the wall chemistry. For example, suitable polyols could include simple low molecular weight aliphatic di, tri or tetraols or polymeric polyols. The polymeric polyols may be members of any class of polymeric polyols, for example: polyether, polyTHF, polycarbonates, polyesters and polyesteramides. One skilled in the art will be aware of many other chemistries available for the production of a polymeric wall about an emulsion droplet. As well as the established isocyanate/amine reaction to produce a polyurea wall chemistry, there can be employed improvements to this technology including for example that in which hydrolysis of the isocyanate is allowed to occur to an amine which can then further react internally to produce the polyurea chemistry (as described for example in U.S. Pat. No. 4,285,720). Variation in the degree of cross-linking may be achieved by altering the ratio of monomeric isocyanate to polymeric isocyanate. As with the conventional isocyanate technology described above, any alternative isocyanates can be employed in this embodiment.

One skilled in the art will be aware that the various methods previously described to produce polyurea microcapsules typically leave unreacted amine (normally aromatic amine) groups attached to the polymer matrix. In some cases it may be advantageous to convert such amine groups to a substantially inert functionality. Preferred are methods for the conversion of such amine groups to urea, amide or urethane groups by post reaction of the microcapsules in an organic solvent with a monoisocyanate, acid chloride or chloroformate respectively.

U.S. Pat. No. 6,020,066 (assigned to Bayer AG) discloses another process for forming microcapsules having walls of polyureas and polyiminoureas, wherein the walls are characterized in that they consist of reaction products of crosslinking agents containing $NH_2$ groups with isocyanates. The crosslinking agents necessary for wall formation include di- or polyamines, diols, polyols, polyfunctional amino alcohols, guanidine, guanidine salts, and compounds derived therefrom. These agents are capable of reacting with the isocyanate groups at the phase interface in order to form the wall.

Preferred materials for the microcapsule include a polyurea, formed as described in U.S. Pat. No. 4,285,720 or a urea-formaldehyde polymer as described in U.S. Pat. No. 4,956,129. Polyurea is preferred because the microcapsule is formed under very mild conditions and does not require acidic pH to promote polymerisation and so is suitable for use when encapsulating acid-sensitive catalysts. The most preferred polymer type for the microcapsule is polyurea as described in U.S. Pat. No. 4,285,720 based on the PMPPI polyisocyanate either alone or in combination with other aromatic di or multi functional isocyantes.

Microencapsulation techniques described above most commonly involve the microencapsulation of an oil phase dispersed within an aqueous continuous phase, and for such systems the catalyst is suitably capable of being suspended within the microencapsulated oil phase or more preferably is soluble in a water-immiscible organic solvent suitable for use as the dispersed phase in microencapsulation techniques. The scope of the present invention is not however restricted to the use of oil-in-water microencapsulation systems and water-soluble catalysts may be encapsulated via interfacial microencapsulation of water-in-oil emulsion systems. Water-soluble catalysts may also be encapsulated via interfacial microencapsulation of water-in-oil-in-water emulsion systems.

The microcapsule wall-forming material may for example be a monomer, oligomer or prepolymer and polymerisation of the material may take place in situ by polymerisation and/or curing of the wall-forming material at the interface. As an alternative, polymerisation may take place at the interface by the bringing together of a first wall-forming material added through the continuous phase and a second wall-forming material in the discontinuous phase.

The ligand may be encapsulated along with the metal catalyst as a component of the organic phase. Thus, the ligand, metal catalyst, solvent, wall forming material and one or more optional other components (such as a free radical initiator) may be dispersed as a single organic phase into the continuous aqueous phase. However, if any of the components are incompatible with one another, it may be advantageous to disperse all the components separately or in combinations wherein the continuous phase conditions are such that the microcapsule polymerisation is delayed until the separate organic components have mixed through diffusion and particle coalescence and division. For example, the ligand can be dissolved in an organic solvent and then dispersed into the aqueous phase either simultaneously with the other organic components or after dispersion of the organic solution of the metal catalyst, wall forming material and optional components (e.g. a free radical initiator). In particular, an organic-soluble ligand may be dissolved along with the metal catalyst, the polymerisable wall forming reactants any optional components (e.g. a free radical initiator), which are then dispersed as a single solution into the continuous aqueous phase. The ligand may be polymerised prior to, during or after formation of the microcapsule shell. The ligand may self-polymerise or may copolymerise with the microcapsule shell or a constituent (e.g. a monomer or prepolymer) thereof.

A process of the invention may therefore comprise:
(a) dissolving or dispersing the catalyst and ligand in a first phase,
(b) dispersing the first phase in a second, continuous phase to form an emulsion,
(c) reacting one or more microcapsule wall-forming materials at the interface between the dispersed first phase and the continuous second phase to form a microcapsule polymer shell encapsulating the dispersed first phase core, and optionally
(d) recovering the microcapsules from the continuous phase.

Preferably, the first phase is an organic phase and the second, continuous phase is an aqueous phase. Suitably a protective colloid (surfactant) is used to stabilise the emulsion. If desired the recovered microcapsules may be washed with a suitable solvent to extract the first phase, and in particular the organic phase solvent from the core and any loosely bound metal catalyst or ligand. A suitable solvent, usually water, may also be used to remove the protective colloid or surfactant. As mentioned above, the ligand may be polymerised prior to, during or after formation of the microcapsule shell. The ligand may self-polymerise or may copolymerise with the microcapsule shell or a constituent (e.g. a monomer or prepolymer) thereof.

In some circumstances, particularly where the ligand is highly reactive or may interfere with the interfacial polymerisation process, it may be advantageous to introduce the ligand after the interfacial polymerisation. The microcapsule shell may, therefore, be formed by interfacial polymerisation in the presence of a catalyst and treated with the ligand. The microencapsulated catalyst may be isolated before subsequent treatment with the ligand. Treatment with the ligand may be carried with or without the need to swell the permeable polymer microcapsule shell. The ligand may self-polymerise or may copolymerise with the microcapsule shell or a constituent (e.g. a monomer or prepolymer) thereof. Typically, the microcapsules are treated with a polymerisable ligand, which is subsequently polymerised.

A process of the invention may therefore comprise:
(a) dissolving or dispersing the catalyst in a first phase,
(b) dispersing the first phase in a second, continuous phase to form an emulsion,
(c) reacting one or more microcapsule wall-forming materials at the interface between the dispersed first phase and the continuous second phase to form a microcapsule polymer shell encapsulating the dispersed first phase core, and
(d) treating the microcapsules with the ligand.

The microcapsules may be recovered from the continuous phase in step (c) before treating with the ligand in step (d). The ligand-treated microcapsules may be isolated and washed with solvent. The ligand may self-polymerise or may copolymerise with the microcapsule shell or a constituent (e.g. a monomer or prepolymer) thereof. Typically, the microcapsules are treated with a polymerisable ligand, which is subsequently polymerised.

In some circumstances, particularly where the metal catalyst is highly reactive or may interfere with the interfacial polymerisation process, it may be advantageous to introduce the metal catalyst after formation of the microcapsule. A process of the invention may therefore comprise forming a microcapsule shell by interfacial polymerisation in the presence of a ligand and then treating the microcapsule shell with a catalyst solution. The microencapsulated ligand may be isolated prior to treatment with the catalyst. Treatment with the metal catalyst may be carried with or without the need to swell the permeable polymer microcapsule shell. The ligand may be polymerised prior to, during or after formation of the microcapsule shell. Typically, the ligand is polymerised prior to treatment with the catalyst solution, e.g. prior or during formation of the microcapsule shell. The ligand may self-polymerise or may copolymerise with the microcapsule shell or a constituent (e.g. a monomer or prepolymer) thereof.

A process of the invention may therefore comprise:
(a) dissolving or dispersing the ligand in a first phase,
(b) dispersing the first phase in a second, continuous phase to form an emulsion,
(c) reacting one or more microcapsule wall-forming materials at the interface between the dispersed first phase and the continuous second phase to form a microcapsule polymer shell encapsulating the dispersed first phase core, and (d) treating the microcapsules with a solution of a catalyst.

The microcapsules may be recovered from the continuous phase in step (c) before treating with the catalyst in step (d). The catalyst-treated microcapsules may be isolated and washed with solvent. As mentioned above, the ligand may be polymerised prior to, during or after formation of the microcapsule shell. Typically, the ligand is polymerised prior to treatment with the catalyst solution. The ligand may self-polymerise or may copolymerise with the microcapsule shell or a constituent (e.g. a monomer or prepolymer) thereof.

With regard to the above processes, of particular mention are those in which the polymerisable ligand is encapsulated along with the metal catalyst as a component of the organic phase. Also of mention are processes in which the polymerisable ligand is first encapsulated as a component of the organic phase and then the metal catalyst post-adsorbed into the encapsulated polymeric ligand by exposing the entrapped ligand to a solution of the metal catalyst. Also of mention are processes in which the polymerisable ligand is post-adsorbed into the microencapsulated metal catalyst by exposing the entrapped metal to an organic solution of the ligand.

The molar ratio of ligand to metal catalyst may be in the range of 1/100 to 100/1, more preferably in the range of 1/20 to 20/1, and more preferably in the range of 1/10 to 10/1.

Preferred ligands include those soluble in organic solvents and not sensitive to water.

Preferably, the continuous phase is water. The amount of organic phase dispersed into the aqueous phase may vary from 1% to about 75% by volume of the aqueous phase present in the reactor. Preferably the amount of organic phase is about 10% to about 50% by volume.

The weight % wall forming material in the organic phase (which may include one or more of the ligand, catalyst and solvent) is in the range 5 to 95%, more preferably 10 to 70% and most preferably 10 to 50%.

The weight % of solvent in the organic phase (which may include one or more of the ligand, catalyst and wall-forming material) is in the range 5 to 95%, more preferably 15 to 90% and most preferably 40 to 80%.

The loading level of the microencapsulated catalyst can be varied. Microencapsulated catalysts with loadings 0.01 mmol/g to 0.8 mmol/g are typical, especially where the loading is based on metal content. Loadings of 0.05 mmol/g to 0.6 mmol/g are preferred.

The microencapsulation of the catalyst and ligand takes place according to techniques well known in the art. Typically the catalyst is dissolved or dispersed in an oil phase which is emulsified into a continuous aqueous phase to form an emulsion which is generally stabilised by a suitable surfactant system. A wide variety of surfactants suitable for forming and stabilising such emulsions are commercially available and may be used either as the sole surfactant or in combination. The emulsion may be formed by conventional low or high-shear mixers or homogenisation systems, depending on particle size requirements. A wide range of continuous mixing techniques can also be utilised. Suitable mixers which may be employed in particular include dynamic mixers whose mixing elements contain movable parts and static mixers which utilise mixing elements without moving parts in the interior. Combinations of mixers (typically in series) may be advantageous. Examples of the types of mixer which may be employed are discussed in U.S. Pat. No. 627,132 which is herein incorporated by reference. Alternatively, emulsions may be formed by membrane emulsification methods. Examples of membrane emulsification methods are reviewed in Journal of Membrane Science 169 (2000) 107-117 which is herein incorporated by reference.

Typical examples of suitable surfactants include:

a) condensates of alkyl (eg octyl, nonyl or polyaryl) phenols with ethylene oxide and optionally propylene oxide and anionic derivatives thereof such as the corresponding ether sulphates, ether carboxylates and phosphate esters;

b) block copolymers of polyethylene oxide and polypropylene oxide such as the series of surfactants commercially available under the trademark PLURONIC (PLURONIC is a trademark of BASF);

c) TWEEN surfactants, a series of emulsifiers comprising a range of sorbitan esters condensed with various molar proportions of ethylene oxide;

d) condensates of $C_8$ to $C_{30}$ alkanols with from 2 to 80 molar proportions of ethylene oxide and optionally propylene oxide; and e) polyvinyl alcohols, including the carboxylated and sulphonated products.

Furthermore, WO 01/94001 teaches that one or more wall modifying compounds (termed surface modifying agents) can, by virtue of reaction with the wall forming materials, be incorporated into the microcapsule wall to create a modified microcapsule surface with built in surfactant and/or colloid stabiliser properties. Use of such modifying compounds may enable the organic phase wall forming material to be more readily dispersed into the aqueous phase possibly without the use of additional colloid stabilisers or surfactants and/or with reduced agitation. The teaching of WO 01/94001 is herein incorporated by reference. Examples of wall modifying compounds which may find particular use in the present invention include anionic groups such as sulphonate or carbon/late, non-ionic groups such as polyethylene oxide or cationic groups such as quaternary ammonium salts.

In addition the aqueous phase may contain other additives which may act as aids to the process of dispersion or the reaction process. For example, de-foamers may be added to lesson foam build up, especially foaming due to gas evolution.

A wide variety of materials suitable for use as the oil phase will occur to one skilled in the art. Examples include, diesel oil, isoparaffin, aromatic solvents, particularly alkyl substituted benzenes such as xylene or propyl benzene fractions, and mixed napthalene and alkyl napthalene fractions; mineral oils, white oil, castor oil, sunflower oil, kerosene, dialkyl amides of fatty acids, particularly the dimethyl amides of fatty acids such as caprylic acid; chlorinated aliphatic and aromatic hydrocarbons such as 1,1,1-trichloroethane and chlorobenzene, esters of glycol derivatives, such as the acetate of the n-butyl, ethyl, or methyl ether of diethylene glycol, the acetate of the methyl ether of dipropylene glycol, ketones such as isophorone and trimethylcyclohexanone (dihydroisophorone) and the acetate products such as hexyl, or heptyl acetate. Organic liquids conventionally preferred for use in microencapsulation processes are xylene, diesel oil, isoparaffins and alkyl substituted benzenes, although some variation in the solvent may be desirable to achieve sufficient solubility of the catalyst in the oil phase.

Certain catalysts may catalyse the wall-forming reaction during interfacial polymerisation. In general it is possible to modify the microencapsulation conditions to take account of this. Some interaction, complexing or bonding between the catalyst and the polymer shell may be positively desirable since it may prevent agglomeration of finely divided or colloidal catalysts.

In some instances, the catalyst and/or ligand being encapsulated may increase the rate of the interfacial polymerisation reactions. In such cases it may be advantageous to cool one or both of the organic and continuous aqueous phases such that interfacial polymerisation is largely prevented whilst the organic phase is being dispersed. The reaction is then initiated by warming in a controlled manner once the required organic droplet size has been achieved. For example, in certain reactions the aqueous phase may be cooled to less than 10° C., typically to between 0° C. to 10° C., prior to addition of the oil phase and then when the organic phase is dispersed the aqueous phase may be heated to raise the temperature above 15° C. to initiate polymerisation.

Microencapsulation of the oil phase droplets containing the catalyst and the ligand may take place by an interfacial polymerisation reaction as described above under an inert atmosphere. The aqueous dispersion of microcapsules containing the catalyst and ligand may be used to catalyse a suitable reaction without further treatment. Preferably however the microcapsules containing the catalyst and the ligand are removed from the aqueous phase by filtration. It is especially preferred that the recovered microcapsules are washed with water to remove any remaining surfactant system and with a solvent capable of extracting the organic phase contained within the microcapsule. Relatively volatile solvents such as halogenated hydrocarbon solvents for example chloroform are generally more readily removed by washing or under reduced pressure than are conventional microencapsulation solvents such as alky substituted benzenes. If the majority of the solvent is removed, the resultant microcapsule may in effect be a substantially solvent-free polymer bead containing the catalyst efficiently dispersed within the microcapsule polymer shell. The process of extracting the organic phase may cause the microcapsule walls to collapse inward, although the generally spherical shape will be retained. If desired the dry microcapsules may be screened to remove fines, for example particles having a diameter less than about 20 microns.

In the case of the microencapsulated palladium acetate microparticles, it is preferred that the recovered water wet microcapsules are washed with copious quantities of deionised water, followed by sequential N,N-dimethylformamide, ethanol, toluene washes and finally hexane or heptane washes. The microcapsules are then dried in a vac oven at 50° C. for approx 4 hours to give a product with greater than 95% non volatile content (by exhaustive drying) and preferably greater than 98% non volatile content.

Use

Depending on the conditions of preparation and in particular the degree of interaction between the catalyst, the ligand and the wall-forming materials, the microencapsulated catalyst-ligand system of the present invention may be regarded at one extreme as a 'reservoir' in which the finely divided catalyst and ligand (either as solid or in the presence of residual solvent) is contained within an inner cavity bound by an integral outer polymer shell or at the other extreme as a solid, amorphous polymeric bead throughout which the finely divided catalyst and ligand is distributed. In practice the position is likely to be between the two extremes. Regardless of the physical form of the encapsulated catalyst-ligand of the present invention and regardless of the exact mechanism by which access of reactants to the catalyst takes place (diffusion through a permeable polymer shell or absorption into a porous polymeric bead), it has been found that encapsulated catalysts and ligands of the present invention permit effective access of the reactants to the catalyst whilst presenting the catalyst and ligand in a form in which it can be recovered and if desired re-used. Furthermore, since in a preferred embodiment the polymer shell/bead is formed in situ by controlled interfacial polymerisation (as opposed to uncontrolled deposition from an organic solution of the polymer), a microencapsulated catalyst-ligand system of the present invention may be used in a wide range of organic solvent-based reactions.

The microcapsules of this invention are regarded as being insoluble in most common organic solvents by virtue of the fact that they are highly cross-linked. As a consequence, the microcapsules can be used in a wide range of organic solvent-based reactions.

The microcapsules may be added to the reaction system to be catalysed and, following completion of the reaction, may be recovered for example by filtration. The recovered microcapsules may be returned to catalyse a further reaction and re-cycled as desired. Alternatively, the microcapsules containing the catalyst and ligand may be used as a stationary catalyst in a continuous reaction. For instance, the microcapsule particles could be immobilised with a porous support matrix (e.g. a membrane). The microcapsules are permeable to the extent that catalysis may take place either by diffusion of the reaction medium through the polymer shell walls or by absorption of the reaction medium through the pore structure of the microcapsule.

The following Examples illustrate the present invention.

EXAMPLE 1

Various types of microencapsulated palladium acetate-ligand systems were produced. The systems were then used in a Suzuki-type reaction and the palladium content of the crude product determined.

In Systems 1A and 1B, palladium acetate was coencapsulated with a p-styryldiphenylphosphine ligand. System 1C was a similar system except that it contained a triphenylphosphine ligand.

In System 2, palladium acetate was coencapsulated with a triphenylphosphine ligand.

Systems 3A and 3B were obtained using a process of the present invention. Palladium acetate was encapsulated with p-styryldiphenylphosphine ligand and the ligand polymerised using a free radical polymerisation process.

In the following procedures, GOSHENOL is polyvinyl alcohol; SOLVESSO 200 is a high boiling (230-257° C.) mixture of aromatics (mainly naphthalenes); TERGITOL XD is the polyoxypropylene polyoxyethylene ether of butyl alcohol; and REAX 100M is sodium lignosulfonate. REAX, TERGITOL and GOSHENOL are added as colloid stabilisers and detergents.

Preparation of Systems 1A, 1B and 1C

An organic phase was formed from palladium(II) acetate $(Pd(OAc)_2)$ dissolved in chloroform, and then stirred for 10 minutes followed by addition of p-styryldiphenylphosphine or triphenylphosphine ligand, and then stirred for a further 30 minutes. To this mixture was added polymethylene polyphenylene di-isocyanate (PMPPI) and the contents stirred for a further 60 minutes.

An aqueous phase was made up consisting of 40% aqueous REAX 100 M solution, 20% aqueous TERGITOL XD solution and 25% aqueous poly(vinyl alcohol) (PVOH) (Gohsenol GL03) solution in deionised water and charged to a Radley's Carousel tube on a Radley's Cooled Carousel unit.

The organic phase mixture was then added via a syringe over ca. 30 seconds to the aqueous phase and held at 1° C. while shearing (using a cross-shaped magnetic stirrer) with the stirrer setting on the stirrer-hotplate at 8. The reaction was maintained under inert atmosphere ($N_2$) throughout. After 3 minutes, the stirrer setting was reduced to 6 and a few drops of de-foamer (DrewPLus S-4382) were added during the onset of polymerisation (detected by carbon dioxide evolution). The suspension thus obtained was warmed to room temperature over 1 hour and stirred for a further 18 hours. The Carousel tube was then transferred to a heated Carousel unit and heated at 65° C. for a further 2 hours. The resulting microcapsules were then filtered though a polyethylene frit (20 micron porosity) and washed on a filter bed according to the following sequence: deionised water (5×10 ml), DMF (2×10 ml), ethanol (3×10 ml), toluene (2×10 ml) and hexane (2×10 ml), and finally dried in a vacuum oven at 45° C.

The loading properties of Systems 1A, 1B and 1C are given in Table 1, together with the quantities and ratios of reagents used in their preparation.

TABLE 1

|  | System 1A | System 1B | System 1C |
| --- | --- | --- | --- |
| Oil phase: |  |  |  |
| CHCl$_3$ (g) | 2.40 | 2.40 | 2.40 |
| PMPPI (g) | 1.20 | 1.20 | 1.20 |
| Pd(OAc)$_2$ (g) | 0.20 | 0.22 | 0.20 |
| p-Styryldiphenylphosphine (g) | 0.13 | 0.28 | — |
| Triphenylphosphine (g) | — | — | 0.12 |
| Aqueous Phase: |  |  |  |
| DI water (g) | 4.95 | 5.17 | 4.94 |
| 40% Reax 100M Soln (g) | 0.59 | 0.62 | 0.59 |
| 25% PVOH soln (g) | 0.47 | 0.49 | 0.47 |
| 20% Tergitol soln (g) | 0.29 | 0.31 | 0.29 |
| Target Properties: |  |  |  |
| Pd/P ratio | 1:0.5 | 1:1 | 1:0.5 |
| Target loading of Pd(OAc)$_2$ (mmol/g) | 0.58 | 0.58 | 0.59 |
| Target loading of ligand (mmol/g) | 0.29 | 0.57 | 0.30 |

Preparation of System 2

An organic phase was formed under nitrogen from Pd(OAc)$_2$ (2.00 g, 98%) dissolved in chloroform (44.7 g), and then stirred for 10 minutes followed by addition of triphenylphosphine (2.40 g, 1:1 Pd/P molar ratio), and then stirred for a further 30 minutes. To this mixture, polymethylene polyphenylene di-isocyanate (PMPPI) (17.60 g) was added and the contents stirred for a further 60 minutes.

An aqueous phase was made up containing 40% REAX 100 M solution (13.34 g), 20% TERGITOL XD solution (6.67 g) and 25% poly (vinyl alcohol) (PVOH) solution (10.67 g) in deionised water (112 g).

The organic phase mixture was then added to an aqueous phase and held at 1° C. while shearing (using a FISHER 4-blade retreat-curve stirrer) at 425 rpm for 8 minutes. The reaction was maintained under inert atmosphere ($N_2$) throughout. After 8 minutes the shear rate was reduced to 225 rpm and few drops of de-foamer (DrewPLus S-4382) were added during the onset of polymerisation (detected by carbon dioxide evolution). The suspension thus obtained was warmed to 12° C. and stirred for a further 16 hours, then at 40° C. for 5 hours. The resulting microcapsules were then filtered though a polyethylene frit (20 micron porosity) and washed on a filter bed according to the following sequence: deionised water (5×100 ml), ethanol (3×100 ml), hexane (3×100 ml), and finally dried in a vacuum oven at 50° C.

ICP Analysis: 4.0% Pd wt/wt, Loading: 0.38 mmol/g (95% Pd encapsulated)
   1.2% P wt/wt, Loading: 0.39 mmol/g (93% P encapsulated)

Preparation of Systems 3A and 3B

The organic phase was formed from palladium(II) acetate (Pd(OAc)$_2$) dissolved in chloroform and then stirred for 10 minutes followed by addition of p-styryldiphenyiphosphine and then stirred for a further 30 minutes. To this mixture was added polymethylene polyphenylene di-isocyanate (PMPPI) and 2,2'-azobisisobutyronitrile (AIBN) and the contents stirred for a further 60 minutes.

An aqueous phase was made up consisting of 40% aqueous REAX 100 M solution, 20% aqueous TERGITOL XD solution and 25% aqueous poly(vinyl alcohol) (PVOH) (Gohsenol GL03) solution in deionised water and charged to a Radley's Carousel tube on a Radley's Cooled Carousel unit.

The organic phase mixture was then added via a syringe over ca 30 seconds to the aqueous phase held at 1° C. while shearing (using a cross-shaped magnetic stirrer) with stirrer setting on the stirrer-hotplate at 8. The reaction was maintained under inert atmosphere ($N_2$) throughout. After 3 minutes the stirrer setting was reduced to 6 and a few drops of de-foamer (DrewPLus S-4382) were added during the onset of polymerisation (detected by carbon dioxide evolution). The suspension thus obtained was warmed to room temperature over 1 hour and stirred for a further 18 hours. The Carousel tube was then transferred to a heated Carousel unit and heated at 65° C. for a further 2 hours. The resulting microcapsules were then filtered though a polyethylene frit (20 micron porosity) and washed on a filter bed according to the following sequence: deionised water (5×10 ml), DMF (2×10 ml), ethanol (3×10 ml), toluene (2×10 ml) and hexane (2×10 ml), and finally dried in a vacuum oven at 45° C.

The loading properties of Systems 3A and 3B are given in Table 2, together with the quantities and ratios of reagents used in their preparation.

TABLE 2

|  | System 3A | System 3B |
| --- | --- | --- |
| Oil phase: |  |  |
| CHCl$_3$ (g) | 2.40 | 2.40 |
| PMPPI (g) | 1.20 | 1.20 |
| Pd(OAc)$_2$ (g) | 0.20 | 0.22 |
| AIBN (g) | 0.001 | 0.003 |
| (p-Styryldiphenyl)phosphine Ligand (g) | 0.13 | 0.28 |
| Aqueous Phase: |  |  |
| DI water (g) | 4.95 | 5.17 |
| 40% Reax 100M Soln (g) | 0.59 | 0.62 |
| 25% PVOH soln (g) | 0.47 | 0.49 |
| 20% Tergitol soln (g) | 0.29 | 0.31 |
| Target Properties: |  |  |
| Pd:P mol ratio | 1:0.5 | 1:1 |
| Target loading Pd(OAc)2 mmol/g | 0.58 | 0.58 |
| Target loading Ligand mmol/g | 0.29 | 0.57 |
| Achieved Properties: (ICP Analysis) |  |  |
| Loading Pd (mmol/g) | 0.48 | 0.50 |
| Loading P (mmol/g) | 0.29 | 0.45 |

General Procedure for Suzuki-Type Reaction

Each System was reacted with 4-methoxyphenylboronic acid and 4-bromofluorobenzene in a Suzuki-type reaction, and the palladium content of the crude product determined.

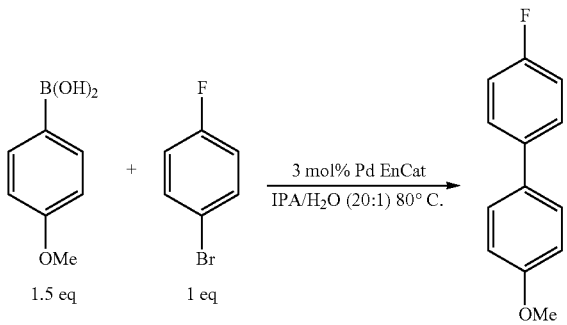 [SMILES: COc1ccc(B(O)O)cc1 ; Fc1ccc(Br)cc1 ; COc1ccc(-c2ccc(F)cc2)cc1]

A 25 ml Radley's Carousel reaction vessel was charged with 4-methoxyphenylboronic acid (0.26 g, 1.72 mmol, 1.5 eq), 4-bromofluorobenzene (0.20 g, 1.14 mmol, 1 eq), potassium carbonate (0.47 g, 3.42 mmol, 3 eq) and 10 ml of IPA/H$_2$O (20:1). To this, the microencapsulated palladium acetate catalyst System (3 mol %; weights are as given in Table 3 below) was added.

TABLE 3

| | System | | | | | |
|---|---|---|---|---|---|---|
| | 1A | 1B | 1C | 2 | 3A | 3B |
| Amount of catalyst added (g) | 0.07 | 0.07 | 0.07 | 0.09 | 0.07 | 0.07 |

The mixture was stirred with a cross-shaped magnetic stirrer under nitrogen and heated to 85° C. using a Radleys Carousel reaction station. The progress of the reaction was monitored by taking samples of reaction mixture at regular time intervals and quantitatively analysing for the product by HPLC. After 22 hours the solid catalyst was removed by filtration through a sintered funnel and the filtrate concentrated under reduced pressure (rotary evaporator) to remove the solvent. ICP analysis of the crude product was then performed. This procedure was repeated for each System.

Results

The results of the ICP analysis are given in Table 4 below, which shows the level of conversion to product at timed intervals using a quantitative HPLC method. The system of the invention (System 3) shows lower levels of palladium residue in the crude product compared with the other Systems, indicating that the phosphine is effectively bound to the polyurea microcapsule matrix. Particularly when comparing System 3A with comparative System 1A (both of which were obtained in the same manner, except for the presence of AIBN free radical initiator), it can be seen that the use of a polymeric phosphine results in significantly lower palladium leaching. The reactivity of the catalyst of System 3 was comparable with that of the other Systems.

TABLE 4

| Time | Conversion (%) at time | | | | | |
|---|---|---|---|---|---|---|
| (hours) | 1A | 1B | 1C | 2 | 3A | 3B |
| 0 | 0 | 0 | 0 | 0 | 0 | 0 |
| 1 | 51.1 | 42.3 | 57.9 | 72.2 | 46.2 | 44.4 |
| 3 | 79.4 | 72.7 | 76.2 | 74.6 | 70.5 | 73.3 |
| 5 | 84.5 | 81.2 | 89.7 | | 82.0 | 81 |
| 6 | 87.7 | 83.6 | 95.9 | | 88.1 | 94.8 |
| 22 | 93.6 | 89.4 | 99.2 | 98.3 | 99.6 | 98.1 |

TABLE 4-continued

| Time | Conversion (%) at time | | | | | |
|---|---|---|---|---|---|---|
| (hours) | 1A | 1B | 1C | 2 | 3A | 3B |
| Residual Pd in crude product (ppm) | 30 | — | — | 65 | 7 | 9 |

EXAMPLE 2

System 4 was obtained by reacting an amine-functional phosphine ligand, namely (diphenylphosphino)propyl-1-amine, with an isocyanate prepolymer to produce a polymeric ligand covalently attached to the final polyurea microcapsule. Due to the air-sensitive nature of the ligand, the oil phase and microencapsulation process were maintained under inert (N$_2$) atmosphere.

Pd (OAc)$_2$ (1.30 g, 98%) was dissolved in chloroform (37 g) followed by addition of 3-(diphenylphosphino)propyl-1-amine (1 g, 99%, 1:0.8 Pd/P) via a syringe and the resulting solution stirred for 10 min. To this mixture, polymethylene polyphenylene di-isocyanate (PMPPI) (15 g) was added and the contents stirred for a further 60 min under N$_2$ atmosphere in a sealed screw-cap jar. The mixture was then added to a cooled (0-1° C.) aqueous mixture containing 40% REAX 100 M solution (10.86 g), 20% TERGITOL XD solution (5.43 g) and 25% Poly Vinyl Alcohol (PVOH) solution (8.69 g) in degassed deionised water (108 ml) while shearing (using a FISHER 4-blade retrieve-curve stirrer) at 500 rpm for 8 minutes. The shear rate was then reduced to 250 rpm and after 60 min at 1° C. the batch temperature was gradually allowed to warm to ambient temperature. A few drops of de-foamer (DrewPLus S-4382) were added during onset polymerisation to disperse the foam. The micro-emulsion thus obtained was stirred at room temperature for 24 h. The microcapsules were then filtered though a polyethylene frit (20 micron porosity) and the beads washed in the following order: deionised water (5×100 ml), DMF (2×100 ml), ethanol (3×100 ml), Toluene (2×100 ml) and hexane (3×100 ml). The dark red-brown beads were then dried in a vacuum oven at 45° C. for 4 hours.

Analytical Results:

ICP Analysis: 3.3% Pd wt/wt, Loading: 0.31 mmol/g (96% Pd encapsulated)

0.62% P wt/wt, Loading: 0.20 mmol/g (95% P encapsulated)

Particle size Distribution: 60-350 μm (average: 195 μm)

EXAMPLE 3

Systems 5, 6 and 7 were obtained using nickel(II) β-diketone complexes which were reacted with an isocyanate prepolymer.

System 5

In System 5, a nickel(II) β-diketone complex was reactrf with the isocyanate in the prepolymer. As a consequence, the resultant organic phase was easily dispersed and converted into a stable microemulsion, producing good quality, useable microcapsules.

Nickel tetramethylheptanedionate (0.20 g, 0.47 mmol) was added to a stirred solution of chloroform (2.6 g) under a nitrogen atmosphere. Toluene-2,4-diisocyanate (0.20 g, 1.00 mmol) was added and the solution warmed to 40° C. then allowed to cool to it over 45 min to give a clear green solution. Polymethylene polyphenyl isocyanate (1.0 g, 2.71 mmol) was added and the solution stirred at 40° C. for a further 15 min.

An aqueous phase of water (8.4 g), 20% w/w Tergitol XD aq (0.50 g), 25% w/w PVOH aq (0.80 g) and 40% w/w Reax 100M aq (1.00 g) was made up in a 50 ml round bottom flask with propeller form overhead stirring. The organic phase was dispersed via pipette over ca. 1 min into the stirred (460 rpm) aqueous phase. Stirring was continued at this speed for 5 min after the start of oil phase addition, then shear reduced to 250 rpm. The microemulsion was stirred at it for 1 h then at 40° C. for 14-18 h. After cooling, the polymer beads were filtered off and washed with water (4×50 ml) to give pale green beads.

System 6

In System 6, a nickel(II) β-diketone complex was reacted with an isocyanate before performing the microemulsion. The complex was only partially soluble in chloroform but after reaction with the isocyanate becomes solubilised. After reaction with the isocyanate, the β-diketone ligand allowed a stable microemulsion to be formed by preventing the nickel from interfering with the stabilisation of the microcapsule. The microcapsules formed after dispersion had a high level of retention of nickel.

Nickel acetoacetate (0.20 g, 0.78 mmol) was added to a stirred solution of chloroform (2.75 g) under a nitrogen atmosphere. Toluene-2,4-diisocyanate (0.30 g, 1.50 mmol) was added and the temperature of the resulting suspension raised to 40° C. After 2 h mixture had become a clear green solution, indicating the reaction between the isocyanate and acetoacetonate ligand had taken place. After cooling to room temperature polymethylene polyphenyl isocyanate (1.0 g, 2.71 mmol) was added and the solution stirred at room temperature for a further 1 h.

An aqueous phase of water (10.7 g), 20% w/w Tergitol XD aq (0.64 g), 25% w/w PVOH aq (1.02 g) and 40% w/w Reax 100M aq (1.28 g) was made up in a 50 ml round bottom flask with propeller form overhead stirring. The organic phase was dispersed via pipette over ca. 1 min into the stirred (460 rpm) aqueous phase. Stirring was continued at this speed for 5 min after the start of oil phase addition, then shear reduced to 250 rpm. The microemulsion was stirred at it for 14-18 h then at 45° C. for 9 h. After cooling, the polymer beads were filtered off and washed with water (4×5 ml) then DMF (5 ml), IMS (2×5 ml), toluene (5 ml) and hexane (2×5 ml) then vacuum dried at 40° C. for 4 h to give pale green beads (1.1 g, 73%).

Nickel analysis by ICP showed 2.4% w/w Ni in the beads, corresponding to a loading of 0.41 mmol/g Ni (80% of target loading).

System 7

Nickel(II) bis(acetoacetonate) (1.20 g, 4.67 mmol) was added to a stirred solution of chloroform (31 g) under a nitrogen atmosphere. Toluene-2,4-diisocyanate (1.95 g, 9.81 mmol) was added and the temperature of the resulting suspension raised to 40° C. After 2 hours, the mixture had become a clear green solution, indicating the reaction between the isocyanate and acetoacetonate ligand had taken place. Polymethylene polyphenyl isocyanate (12.0 g, 32.5 mmol) was added and the solution stirred for a further hour at room temperature, the mixture remaining clear.

An aqueous phase of water (85.5 g), 20% w/w Tergitol XD aq (11.6 g), 25% w/w PVOH aq (13.8 g) and 40% w/w Reax 100M aq (17.3 g) was made up in a jacketed flange reactor with propeller form overhead stirring and warmed to 30° C. using a heater/chiller unit. The organic phase was dispersed via a pressure equalised dropping funnel over ca. 1 min into the stirred (390 rpm) aqueous phase. Stirring was continued at this speed for 5 min after the start of oil phase addition, then shear reduced to 240 rpm. The microemulsion was stirred at 30° C. for 14-18 h then at 45° C. for a further 5 h.

After cooling, the polymer beads were filtered off and washed with water (4×50 ml) then DMF (2×25 ml), IMS 2×25 ml), toluene (25 ml) and hexane (2×25 ml) then vacuum dried at 40° C. for 4 h to give pale green beads (12.6 g, 83%).

The invention claimed is:

1. A process for the preparation of a microencapsulated catalyst-ligand system, which comprises:
    (i) forming a microcapsule shell by interfacial polymerisation in the presence of a transition metal catalyst and a ligand; or
    (ii) forming a microcapsule shell by interfacial polymerisation in the presence of a transition metal catalyst and treating the microcapsule shell with a ligand; or
    (iii) forming a microcapsule shell by interfacial polymerisation in the presence of a ligand and treating the microcapsule shell with a transition metal catalyst solution;
   wherein the process further comprises:
    (iv) polymerising the ligand by free radical polymerisation after formation of the microcapsule shell;
   wherein the ligand is an organic ligand of formula (I):

$$PR^1R^2R^3 \qquad (I)$$

wherein;
    $R^1$, $R^2$, and $R^3$ are each independently an optionally substituted hydrocarbyl group, an optionally substituted hydrocarbyloxy group, or an optionally substituted heterocyclyl group or one or more of $R^1$ and $R^2$, $R^1$ and $R^3$, $R^2$ and $R^3$ optionally being linked in such a way as to form an optionally substituted ring(s); and
    at least one of $R^1$, $R^2$, and $R^3$ comprises a group polymerisable by free radical polymerisation.

2. The process according to claim 1, which comprises forming the microcapsule shell by interfacial polymerisation in the presence of the catalyst and the ligand.

3. The process according to claim 2, which comprises
    (a) dissolving or dispersing the catalyst and a ligand in a first phase;
    (b) dispersing the first phase in a continuous second phase to form an emulsion;
    (c) reacting one or more microcapsule wall-forming materials at interface between the dispersed first phase and the continuous second phase to form a microcapsule polymer shell encapsulating the dispersed first phase; and optionally
    (d) recovering the microcapsules from the continuous phase.

4. The process according to claim 1, which comprises forming a microcapsule shell by interfacial polymerisation in the presence of a catalyst and treating the microcapsule shell with a ligand.

5. The process according to claim 4, which comprises
    (a) dissolving or dispersing the catalyst in a first phase;
    (b) dispersing the first phase in a continuous second phase to form an emulsion;
    (c) reacting one or more microcapsule wall-forming materials at interface between the dispersed first phase and the continuous second phase to form a microcapsule polymer shell encapsulating the dispersed first phase; and
    (d) treating the microcapsules with a ligand.

6. The process according to claim 1, which comprises forming a microcapsule shell by interfacial polymerisation in the presence of a ligand and treating the microcapsule shell with a catalyst solution.

7. The process according to claim 6, which comprises
(a) dissolving or dispersing the ligand in a first phase;
(b) dispersing the first phase in a continuous second phase to form an emulsion;
(c) reacting one or more microcapsule wall-forming materials at interface between the dispersed first phase and the continuous second phase to form a microcapsule polymer shell encapsulating the dispersed first phase; and
(d) treating the microcapsules with a solution of a catalyst.

8. The process according to claim 1, wherein the interfacial polymerisation comprises condensation of at least one polyisocyanate or tolylene diisocyanate.

9. The process according to claim 8, wherein the polyisocyanates or tolylene diisocyanates are selected from the group consisting of 1-chloro-2,4-phenylene diisocyanate, m-phenylene diisocyanate (and its hydrogenated derivative), p-phenylene diisocyanate (and its hydrogenated derivative), 4,4'-methylenbis(phenyl isocyanate), 2,4-tolylene diisocyanate, tolylene diisocyanate (60% 2,4-isomer, 40% 2,6-isomer), 2,6-tolylene diisocyanate, 3,3'-dimethyl-4,4'-biphenylene diisocyanate, 4,4'-methylenebis (2-methylphenyl isocyanate), 3,3'-dimethoxy-4,4'-biphenylene diisocyanate, 2,2',5,5'-tetramethyl-4,4'-biphenylene diisocyanate, 80% 2,4- and 20% 2,6-isomer of tolylene diisocyanate, polymethylene polyphenylisocyanates (PMPPI), 1,6-hexamethylene diisocyanate, isophorone diisocyanate, tetramethylxylene diisocyanate, and 1,5-naphthylene diisocyanate.

10. The process according to claim 1, wherein the catalyst is a transition metal catalyst wherein the transition metal is selected from the group consisting of platinum, palladium, osmium, ruthenium, rhodium, iridium, rhenium, scandium, cerium, samarium, yttrium, ytterbium, lutetium, cobalt, titanium, chromium, copper, iron, nickel, manganese, tin, mercury, silver, gold, zinc, vanadium, tungsten, and molybdenum.

11. The process according to claim 10, wherein the transition metal is palladium.

12. The process according to claim 11, wherein the palladium is in the form of an organic solvent-soluble material.

13. The process according to claim 11, wherein the palladium is in the form of palladium acetate.

14. The process according to claim 1, wherein at least one of $R^1$, $R^2$, and $R^3$ comprises a styryl group.

15. The process according to claim 14, wherein the ligand of formula (1) is selected from the group consisting of (4-styryl)diphenylphosphine, di-(4-styryl)phenylphosphine, tri-4-styrylphosphine, and corresponding 2-styryl and 3-styryl isomers thereof, (4-styryl)di-2-tolylphosphine, di-(4-styryl)-2-tolylphosphine, (4-styryl)di-2-tolylphosphine, di-(4-styryl)-2-tolylphosphine and corresponding 2-styryl and 3-styryl isomers thereof, allyldiphenylphosphine, diallylphenylphosphine, triallylphosphine, allydibutylphosphine, vinyldiphenylphosphine, divinylphenylphosphine, trivinylphosphine, and the following ligands:

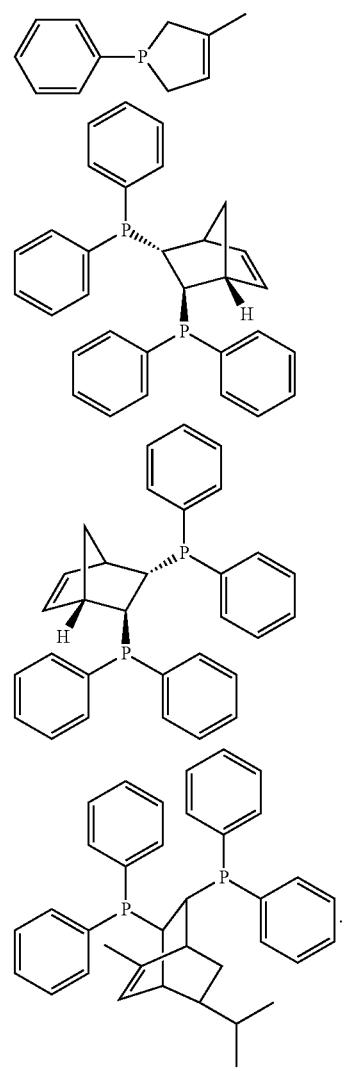

* * * * *